L. KING.
Car Starter.
No. 8,609.
2 Sheets—Sheet 1.
Patented Dec. 23, 1851.
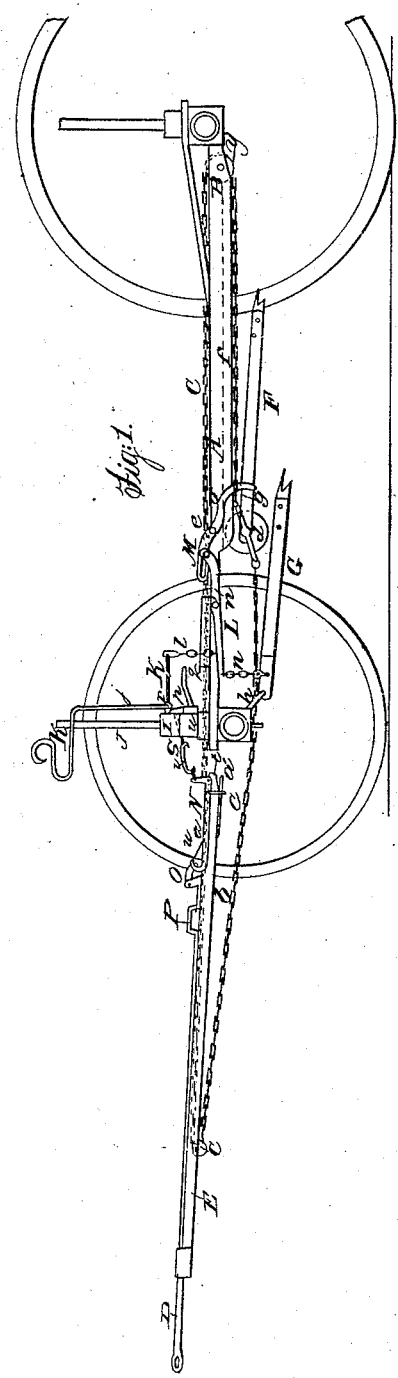

L. KING.
Car Starter.
No. 8,609.
2 Sheets—Sheet 2.
Patented Dec. 23, 1851.
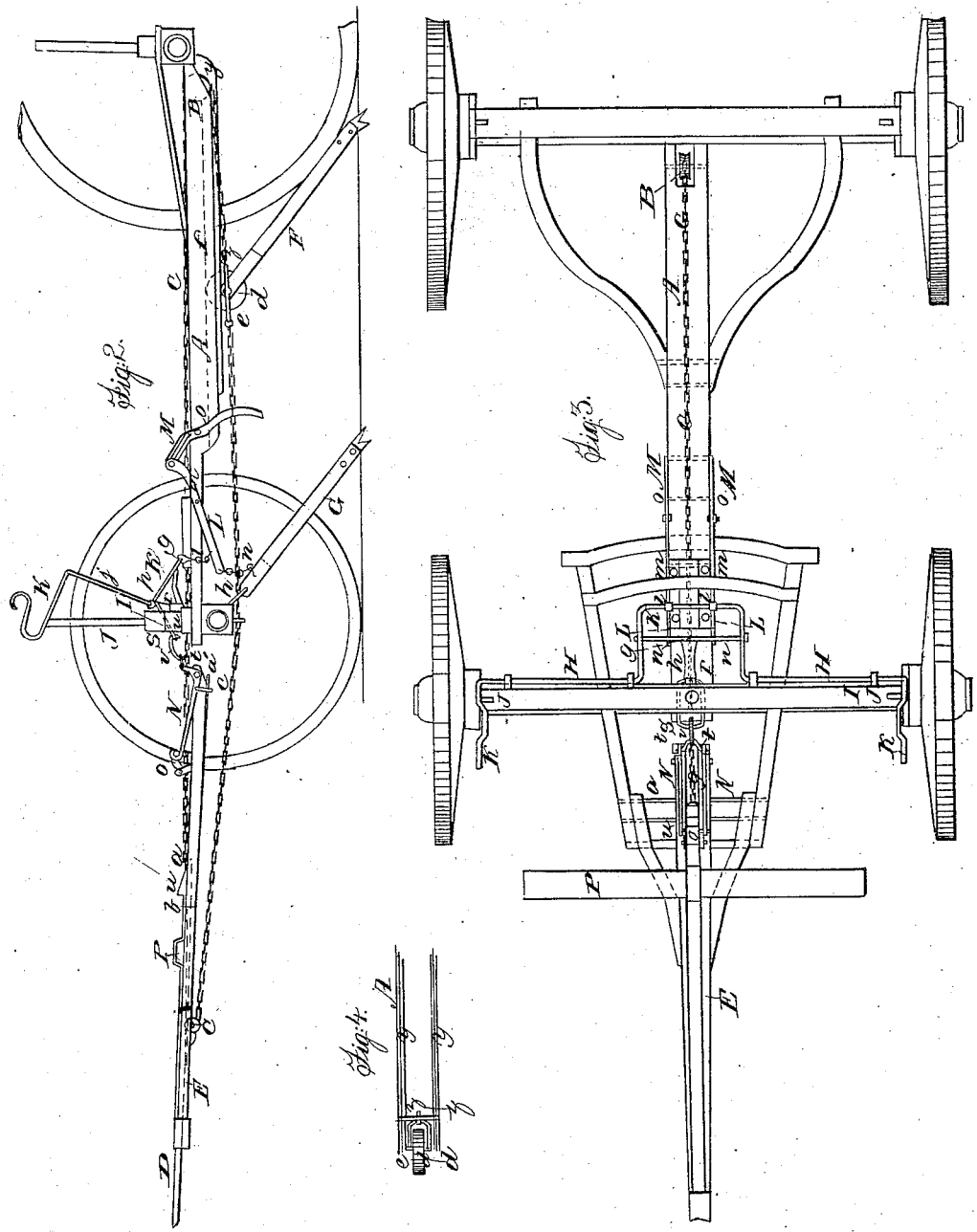

UNITED STATES PATENT OFFICE.

LEWIS KING, OF MADISON, NEW YORK.

CARRIAGE.

Specification of Letters Patent No. 8,609, dated December 23, 1851.

*To all whom it may concern:*

Be it known that I, LEWIS KING, of Madison, in the county of Madison and State of New York, have invented a new and useful improvement in increasing the power of the draft of wagons and other vehicles in ascending hills and in other cases where an increase of draft is necessary; and I do hereby declare that the following is a full, clear, and exact description of the construction and operation of the same, reference being had to the annexed drawings, making a part of this specification, in which—

Figure 1, is a side elevation of wagon showing the position of the several parts comprising the improvement when not in use, and the draft consequently not increased. Fig. 2, is a side elevation of a wagon showing the operation of the invention, and the manner in which the draft is increased. Fig. 3, is a plan or bird's eye view of a wagon, the improvement not being in use, as in Fig. 1. Fig. 4, is an under view of a portion of the perch, showing the guides and slide by which the friction pulley of the dog is kept in the recess in the underside of the perch.

Similar letters of reference indicate corresponding parts in each of the several figures.

The nature of my invention consists in increasing the draft of wagons or other vehicles by means of a pulley and chain, so arranged and connected to the wagon that when required the draft will act directly upon the chain instead of the wagon, the wagon and its load being drawn forward by means of the chain passing over the pulley; a dog attached to the chain underneath the perch rests firmly in the ground while the load is being moved forward. By this arrangement the draft is increased double, and the wagon moves along with half the velocity of the horses.

To enable others skilled in the art to make and use my invention, I will proceed to describe its construction and operation.

A is the perch connected in the usual manner to the front and back axles.

B is a pulley inserted in the perch near the back axle, Figs. 1, 2 and 3.

C is a chain which passes around the pulley B. The ends of this chain are connected to a slide bar D which works in a groove (*g*) in the upper surface of the pole F. One end of the chain is connected to the end of the slide bar as seen more clearly at (*a*) Fig. 3. The other end of the chain is connected to the underside of the slide bar at (*b*) as seen by the dotted lines in Figs. 1 and 2, the chain passing over a small pulley (*c*) inserted in the pole and passing into the groove before mentioned in which the slide bar moves the groove being sufficiently large to receive the chain.

F is a dog having a friction roller (*d*) on its upper end. This dog is attached to the chain C as seen in Figs. 1 and 2, a band or strip of metal (*e*) being bent so as to encircle the friction roller, said band being attached to the top or upper part of the dog, the bolt which secures the band to the dog passing through the center of the roller and forming its axis. The chain is connected to each end of the band. A recess or groove is cut in the under side of the perch A the depth of which is indicated by the dotted lines (*f*) Figs. 1 and 2.

G is a dog attached to the front axle and working loosely on a staple (*h*).

H is a bar which passes along the inner side of the front bolster I through eyes. The ends of this bar are bent up vertically and form handles or levers (*j*) (*j*) to turn the bar. The upper parts (*k*) (*k*) of these handles are so bent as to bear against the bolster stakes J J and by their elasticity the stakes fit in a bend by which the bar H is prevented from moving. At the center of the bar there is a square or loop K which projects over the perch A at right angles to the handles or levers (*j*) (*j*). On the outer end of this square or loop is attached two chains (*l*) (*l*) the lower ends of which are connected to two levers L, L placed on each side of the perch. These levers have the same fulcrum (*m*) formed by a bolt passing entirely through the perch. At one end of the levers L, L are attached chains (*n*) (*n*) which are connected to the upper part of the dog G. The other ends of the levers L, L have pins through them which work in slots in the ends of the levers M, M. These levers have their fulcrum at (*o*) and it is formed by a bolt passing through the perch the same as the fulcrum of the levers L, L. The lower end of the levers M, M are connected by a rod below the perch, see dotted lines in Fig. 3, and the dog F when the improvement is not in use is held up by this rod see Fig. 1, the friction roller (*d*) being between the levers M, M underneath the perch. Now the object of the levers M M, L L, and the chains (*l*) (*l*) and (*n*) (*n*) is to raise and lower the dog.

By referring to Figs. 1 and 2 the operation will be seen. If the handles or levers (*j*) (*j*) of the bar H are thrown back as shown in Fig. 2, the ends of the levers L, L to which the chains (*n*) (*n*) are attached will fall by their own gravity and of course the lower end of the dog G will fall. The opposite ends of the levers L, L will throw up the ends of the levers M, M in consequence of the pins in the ends of the levers L, L working in the slots in the levers M, M, and consequently the lower end of the dog F will fall. There is another office however which the bar H performs upon being turned. It releases the slide bar D from the pole E. This is done in the following manner: (*p*) is a bent lever having its fulcrum at (*w*) which is attached to the bolster I. At the end of the horizontal arm of the lever (*p*) there is a rod (*q*) which is parallel to the bar H, and upon which the sides of the square or loop K act when depressed. The vertical arm (*r*) of the lever (*p*) is clasped by a link (*s*) which passes through a mortise hole in the bolster. This link is connected by a hook (*v*) to the ends of the lever N on the pole E the fulcrum of the levers being at (*t*). The opposite ends of the levers N are attached to a pawl O which catches into a notch or projection (*u*) on the slide bar; now it will be seen that when the rod (*q*) is depressed by the sides of the square or loop K the vertical arm (*r*) draws back the link (*s*), and the ends of the levers N to which the pawl O is attached are thrown up and with them the pawl O see Fig. 2.

When the improvements is in use not the several parts are in the position as seen in Fig. 1, the slide bar D connected to the pole E by the pawl O catching into the notch or projection (*u*) on the slide bar; when in this state of course there is no increase of draft, and the wagon is drawn by the horses as usual; but when it is desired to increase the draft the handles or lever (*j*) (*j*) are thrown back by the driver as seen in Fig. 2 and the lower ends of the dogs F, G, fall to the ground. The pawl O is also relieved of the notch or projection (*u*) on the slide bar; the horses now draw out the slide bar D, the bar P to which the swivel trees are attached being fastened to the slide bar. The chain C passes around the pulley B, the end of the dog F being firmly in the ground for when the chain begins to draw upon it a metal point (*x*) at the lower end is forced into the ground making the dog perfectly stationary; the wagon and its load thus passes along with half the speed of the horses, and the draft is increased double. When the slide bar is drawn up as far as it is allowed to go, the horses are backed by the driver and the slide bar runs back in the groove (*g*) in the pole, the dog, F also returning to its original position the wagon being secured by the dog G, for when the dog F is moving the dog G is stationary, and when the dog F is stationary the dog G is of course moving with the wagon.

The operation of the chain and pulley is precisely similar to a lever of the second kind, the horses being the power, the wagon and load the weight and the chain where it is attached to the band (*e*) the fulcrum or fixed points. What I gain in power I lose in speed. This is familiar and well known. It will be seen that the friction roller (*d*) works in the recess in the under side of the perch A as the perch passes over it; guide rods (*y*) (*y*) are placed underneath the perch on which a slide (*z*) works, more particularly seen in Fig. 4 for the purpose of keeping the roller in the groove.

The dog G separately is not a new device as it is frequently used on wagons, and attached as I have it.

The advantages of my improvement are that I can increase the draft when desired in a moment of time, as in ascending hills, or in cases where a wagon gets in holes in the road, or is obstructed by ruts or other obstacles. When it is desired to disconnect the improvements, or decrease the draft the driver draws forward the handles or levers (*j*) (*j*) to a vertical position, and the chains (*l*) (*l*) and (*n*) (*n*) with the lever, L, L raise the dog, G. The lower ends of the lever M, M are also raised at the same time and with them the dog F, as the friction roller (*d*) and upper parts of the dog is over the rod which connects the lower end of the levers M, M underneath the perch A—that is, when the horses are backed and the slide bar is run back the required distance in the groove (*g*) in the pole. The link (*s*) and hook *v* are also brought forward and the pawl O brought down in the notch or projection (*u*) by the spring (*a′*) acting upon the levers N.

It may not be amiss to state that the hounds, braces, etc., attached to the pole and perch are seen in Fig. 3. They are omitted in Figs. 1 and 2 for the purpose of preventing confusion, there is nothing novel in their construction.

Having thus described the nature and operation of my invention. What I claim as new and desire to secure by Letters Patent, is—

The employment or use of the chain C and pulley B, in combination with the dogs F, G, and slide bar D, constructed and operating in the manner and for the purpose substantially as set forth, the lower ends of the dogs being raised or depressed by means of the levers M, M, L, L operated upon by the square or loop K, or any other equivalent device, and the slide bar D attached to, or detached from the pole E by means of the levers N and pawl O operated upon by the bent lever p or their equivalents.

LEWIS KING.

Witnesses:
   D. P. BUCKINGHAM,
   S. R. HOWE.